(12) United States Patent
Obermeyer et al.

(10) Patent No.: US 12,160,138 B2
(45) Date of Patent: Dec. 3, 2024

(54) MOTOR GENERATOR WITH IMPROVED AIR GAP FLUX ALIGNMENT

(71) Applicant: BHE Turbomachinery, LLC, Portland, OR (US)

(72) Inventors: Henry K. Obermeyer, Wellington, CO (US); Tanner Grider, Lakewood, CO (US)

(73) Assignee: BHE TURBOMACHINERY, LLC, Portland, OR (US)

( * ) Notice: Subject to any disclaimer, the term of this patent is extended or adjusted under 35 U.S.C. 154(b) by 251 days.

(21) Appl. No.: 17/615,565

(22) PCT Filed: Jun. 1, 2020

(86) PCT No.: PCT/US2020/035616
§ 371 (c)(1),
(2) Date: Nov. 30, 2021

(87) PCT Pub. No.: WO2020/243727
PCT Pub. Date: Dec. 3, 2020

(65) Prior Publication Data
US 2022/0247244 A1   Aug. 4, 2022

Related U.S. Application Data

(60) Provisional application No. 62/855,908, filed on May 31, 2019.

(51) Int. Cl.
*H02K 1/16* (2006.01)
*H02K 1/278* (2022.01)
(Continued)

(52) U.S. Cl.
CPC ............. *H02K 1/165* (2013.01); *H02K 1/278* (2013.01); *H02K 3/12* (2013.01); *H02K 3/48* (2013.01); *H02K 15/105* (2013.01)

(58) Field of Classification Search
CPC .......... H02K 1/165; H02K 1/278; H02K 3/12; H02K 3/48; H02K 15/105
See application file for complete search history.

(56) References Cited

U.S. PATENT DOCUMENTS 4,786,853 A   11/1988   VanMaaren
5,180,445 A   1/1993   Bogatin
(Continued)

FOREIGN PATENT DOCUMENTS

CN   201805342 U   4/2011
CN   102761193 A   10/2012
(Continued)

OTHER PUBLICATIONS

ABB VM1 Medium voltage vacuum circuit breakers with magnetic drive 12 . . . 24 kV-630 . . . 4000 A-16 . . . 50 kA, Brochure, copyright 2018.
(Continued)

*Primary Examiner* — Jue Zhang
(74) *Attorney, Agent, or Firm* — Miller Nash LLP

(57) ABSTRACT

The present inventions include a rotating electromagnetic machine such as a motor or generator wherein changes of flux direction adjacent the air gap are avoided. The disclosed improvements apply to permanent magnet alternators, induction motors and generators, doubly fed induction generators, and the like. Adaptation of coils to and fixation within the required slot geometries are disclosed. Excitation systems co-located within the primary rotor core and primary stator core are also disclosed. The use of rubber vulcanized to the rotor in conjunction with a stainless steel rotor sleeve is also disclosed.

15 Claims, 21 Drawing Sheets

(51) Int. Cl.
*H02K 3/12* (2006.01)
*H02K 3/48* (2006.01)
*H02K 15/10* (2006.01)

(56) References Cited

U.S. PATENT DOCUMENTS

| | | | |
|---|---|---|---|
| 5,708,315 | A | 1/1998 | Gould et al. |
| 5,914,552 | A | 6/1999 | Hsu et al. |
| 6,481,090 | B1 | 11/2002 | Franco et al. |
| 6,940,380 | B1 | 9/2005 | Leijon |
| 7,355,309 | B2 | 4/2008 | Costin et al. |
| 7,646,125 | B2 | 1/2010 | Okamoto et al. |
| 7,781,932 | B2 | 8/2010 | Jansen |
| 7,936,102 | B2 | 5/2011 | Pabst et al. |
| 8,405,269 | B2 | 3/2013 | Spaggiari |
| 8,844,119 | B2 | 9/2014 | Ha et al. |
| 9,312,057 | B2 | 4/2016 | Martinek et al. |
| 9,813,004 | B2 | 11/2017 | Shrestha et al. |
| 9,882,443 | B2 | 1/2018 | Cortada Acosta |
| 10,243,439 | B2 | 3/2019 | Li et al. |
| 2002/0047268 | A1 | 4/2002 | Leijon et al. |
| 2006/0103254 | A1 | 5/2006 | Horst |
| 2008/0238219 | A1 | 10/2008 | Hoshino et al. |
| 2008/0278272 | A1 | 11/2008 | Arnold |
| 2009/0130448 | A1 | 5/2009 | Morrissey et al. |
| 2010/0213885 | A1* | 8/2010 | Ichiyama ............... H02K 21/12 310/156.46 |
| 2015/0138463 | A1 | 5/2015 | Jinta |
| 2015/0145623 | A1 | 5/2015 | McNerney et al. |
| 2015/0292392 | A1 | 10/2015 | Kubes |
| 2015/0292397 | A1 | 10/2015 | Kubes |
| 2015/0292399 | A1 | 10/2015 | Kubes |
| 2016/0087514 | A1 | 3/2016 | Saint-Michel |
| 2016/0097388 | A1 | 4/2016 | Nowitzky et al. |
| 2016/0141921 | A1 | 5/2016 | Kubes |
| 2016/0172916 | A1 | 6/2016 | El Baraka et al. |
| 2016/0329791 | A1* | 11/2016 | Li ............................ H02K 3/18 |
| 2019/0386531 | A1 | 12/2019 | Shrestha et al. |
| 2019/0386548 | A1 | 12/2019 | Yoshinaga et al. |
| 2019/0386549 | A1 | 12/2019 | Prieto et al. |
| 2019/0393738 | A1 | 12/2019 | Tsuchida et al. |
| 2019/0393765 | A1 | 12/2019 | Holcomb |
| 2021/0336574 | A1 | 10/2021 | Toliyat et al. |

FOREIGN PATENT DOCUMENTS

| | | |
|---|---|---|
| CN | 103904801 A | 7/2014 |
| CN | 203747531 U | 7/2014 |
| CN | 105391208 A | 3/2016 |
| CN | 206060389 U | 3/2017 |
| CN | 107994736 A | 5/2018 |
| CN | 207382135 U | 5/2018 |
| CN | 207426909 U | 5/2018 |
| CN | 207518404 U | 6/2018 |
| CN | 108880181 A | 11/2018 |
| CN | 107872134 A | 2/2020 |
| DE | 4423840 A1 | 1/1996 |
| DE | 19706371 | 8/1998 |
| DE | 102008018724 A1 | 10/2009 |
| DE | 102015207663 A1 | 10/2016 |
| EP | 1983634 A2 | 10/2008 |
| EP | 2991204 A1 | 3/2016 |
| JP | S5961457 A | 4/1984 |
| JP | 2006315245 A | 11/1994 |
| JP | 2001112193 A | 4/2001 |
| JP | 2004357418 A | 12/2004 |
| JP | 2005130553 A | 5/2005 |
| JP | 2005287271 A | 10/2005 |
| JP | 2009213291 A | 9/2009 |
| JP | 2009240111 A | 10/2009 |
| JP | 2013099038 A | 5/2013 |
| KR | 10-0857798 A | 4/2008 |
| WO | 1997045847 | 12/1997 |
| WO | 200072334 A1 | 11/2000 |
| WO | 2007004009 A2 | 1/2007 |
| WO | 2008098173 A2 | 8/2008 |
| WO | 2012022589 A1 | 2/2013 |
| WO | 2013175117 A1 | 11/2013 |
| WO | 2013132098 A2 | 12/2013 |
| WO | 2013178942 A1 | 12/2013 |
| WO | 2016087817 A1 | 6/2016 |
| WO | 2016177968 A1 | 10/2016 |
| WO | 2017061694 A1 | 4/2017 |
| WO | 20170938986 A1 | 6/2017 |
| WO | 201923982 A1 | 12/2019 |

OTHER PUBLICATIONS

U.S. Appl. No. 62/855,908, filed May 31, 2019.
International Application No. PCT/US2020/035616; Written Opinion of the International Searching Authority dated Oct. 9, 2020.
International Application No. PCT/US2020/035616; International Search Report dated Oct. 9, 2020.
Extended European Search Report issued in European Patent Application No. 20814563.1, mailed Oct. 16, 2023, 19 pages.
Partial Supplementary European Search Report issued in European Patent Application No. 20814563.1, mailed May 26, 2023, 15 pages.

\* cited by examiner

PRIOR ART
FIG. 1
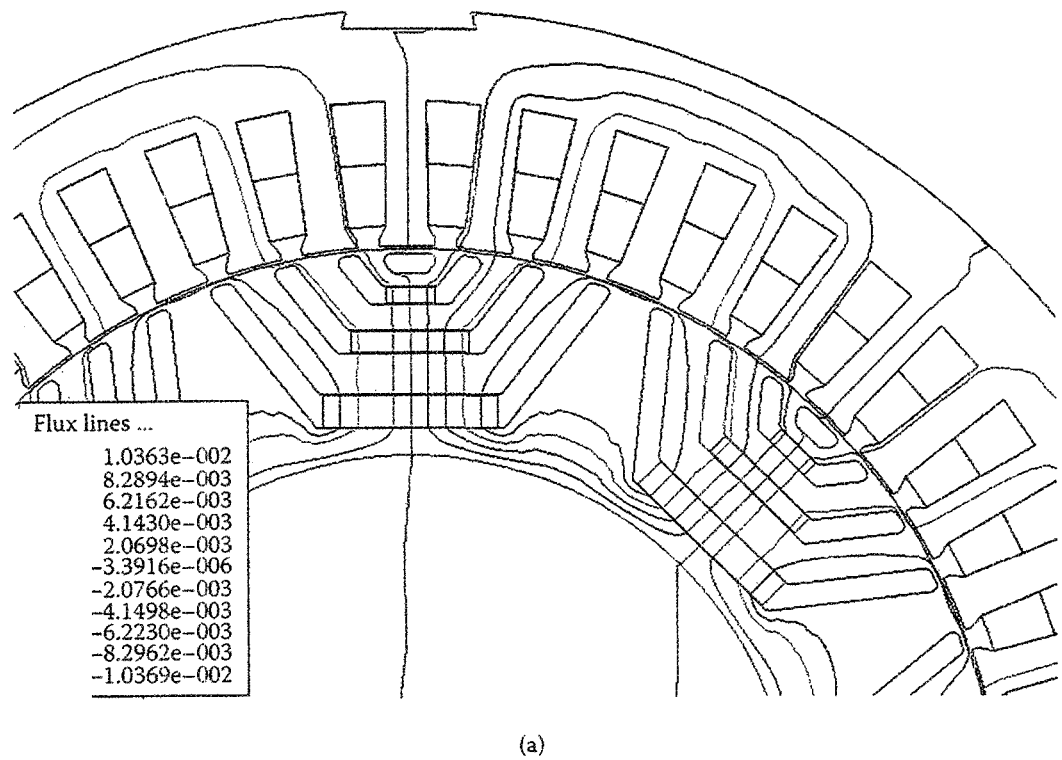
(a)
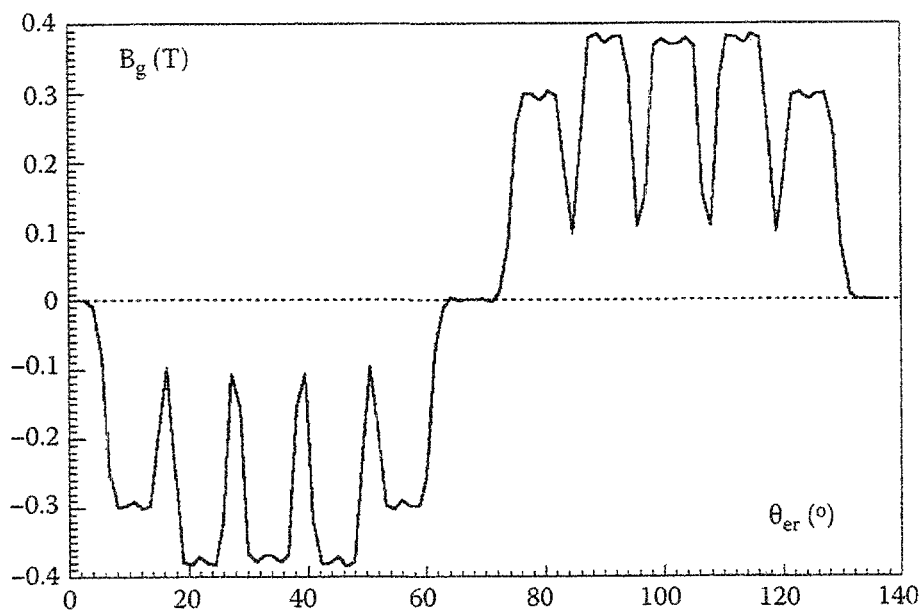

PRIOR ART
FIG. 3
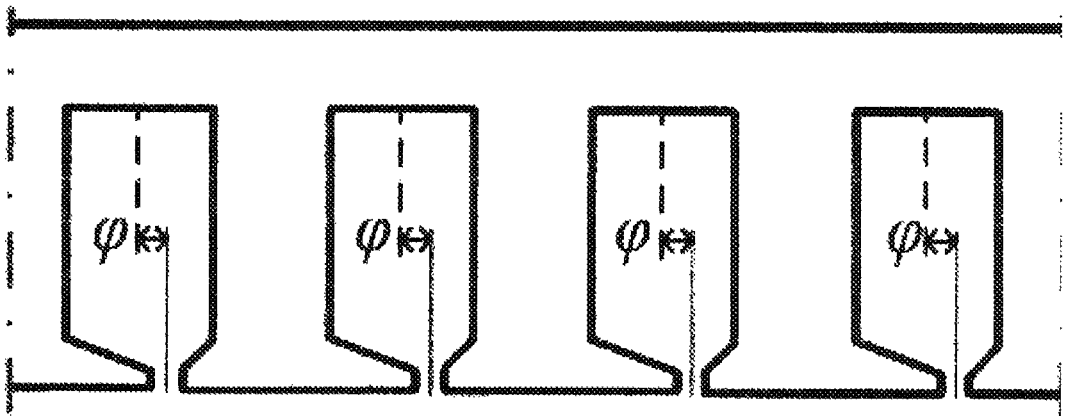
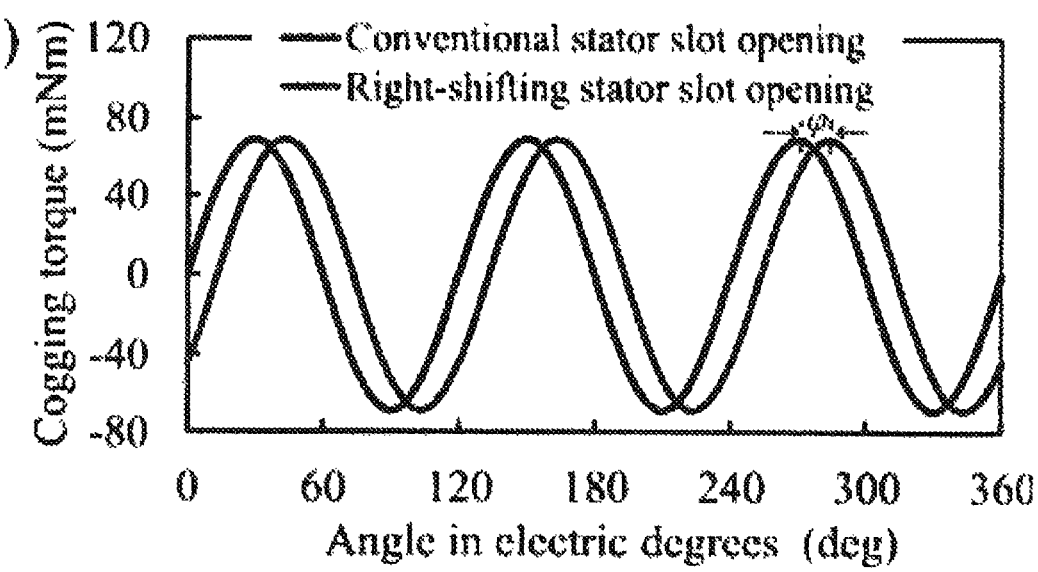

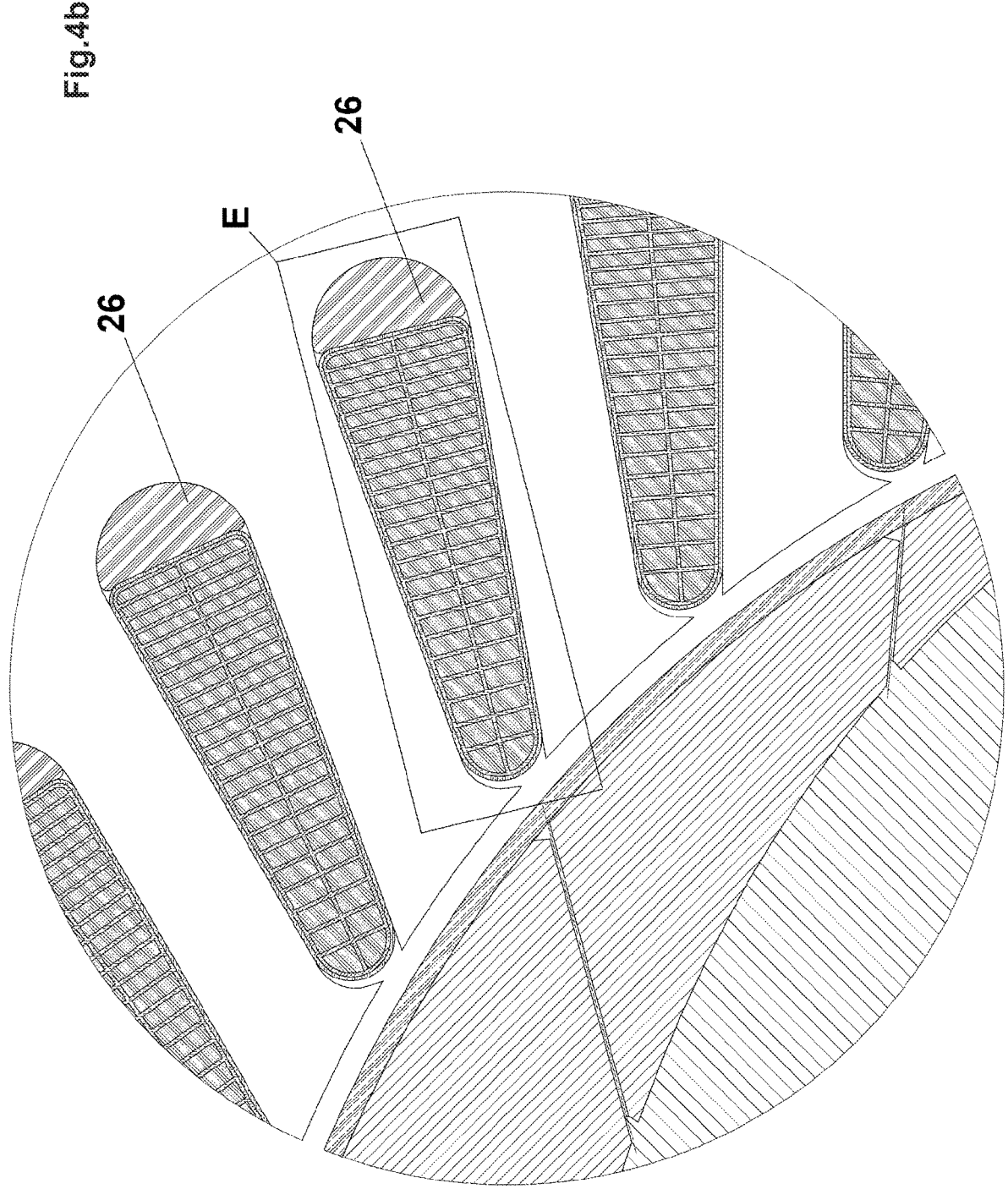

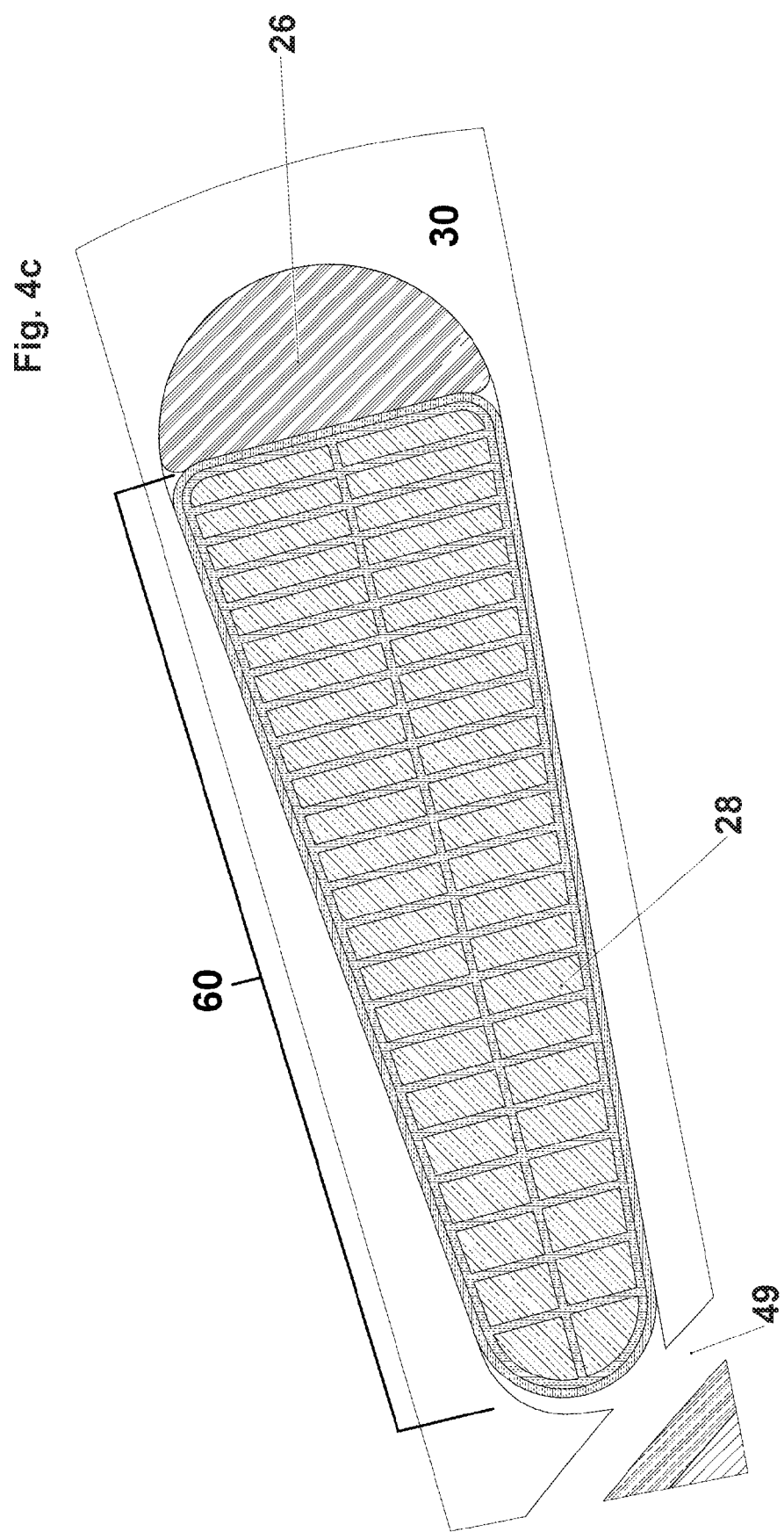

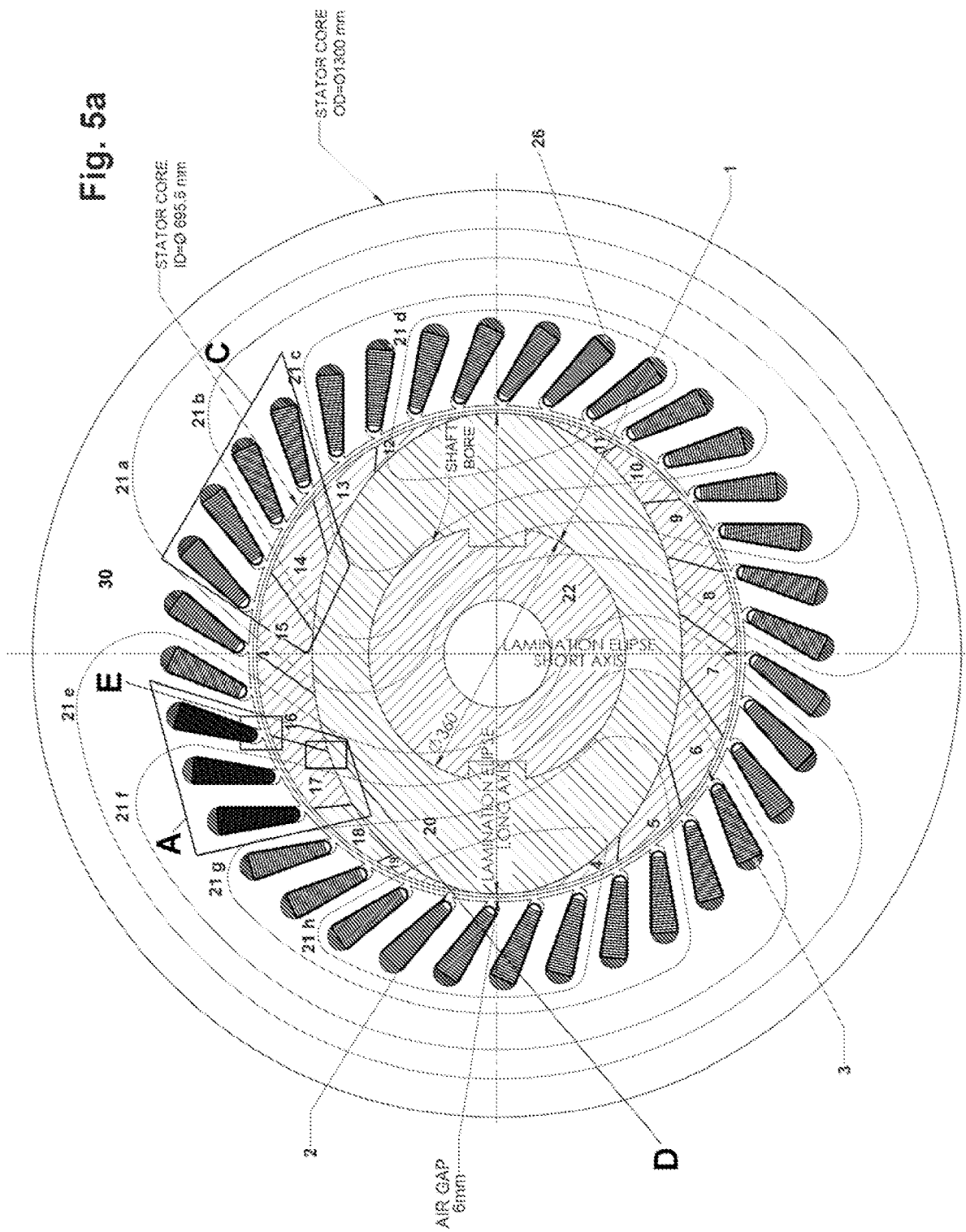

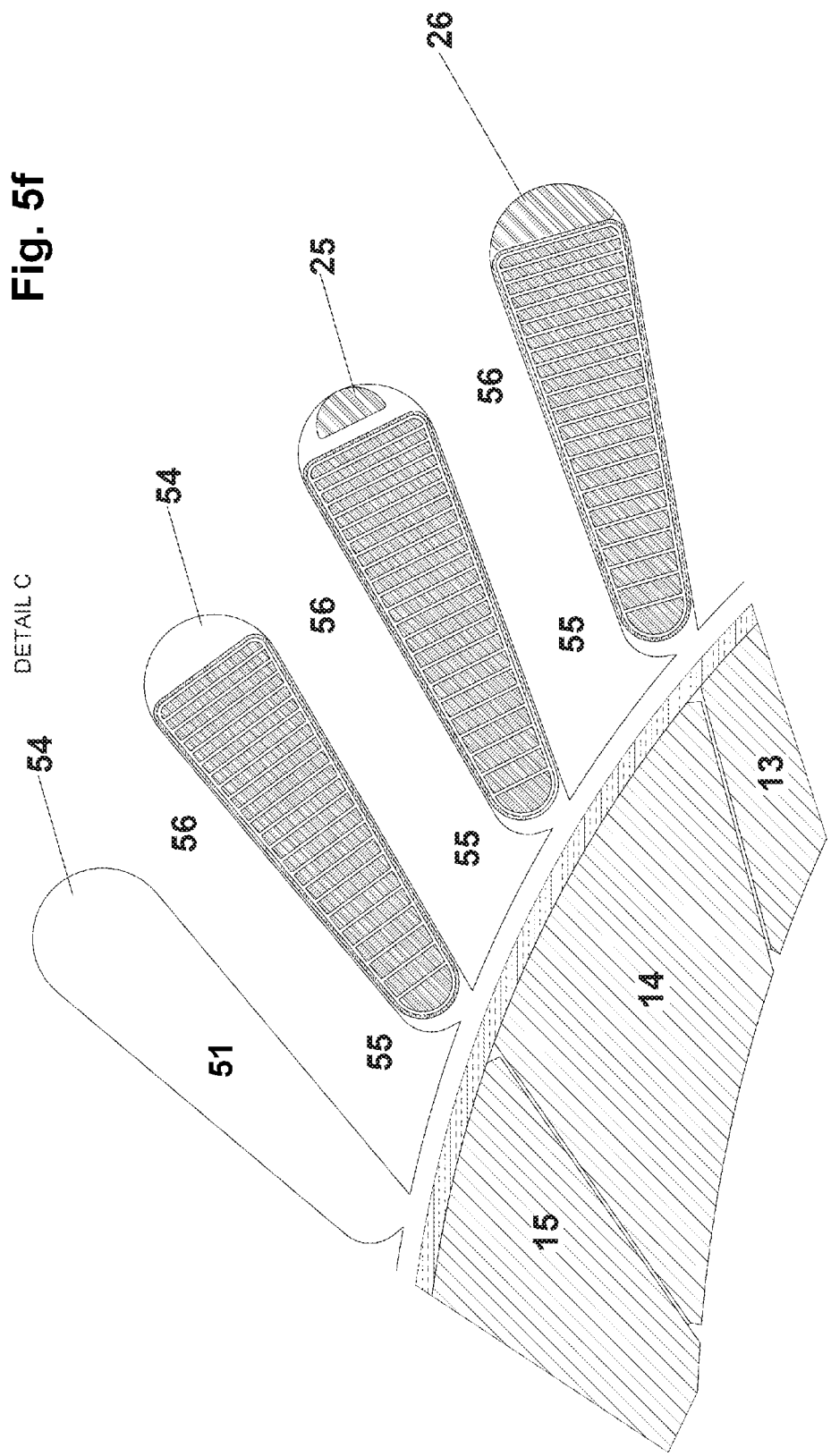

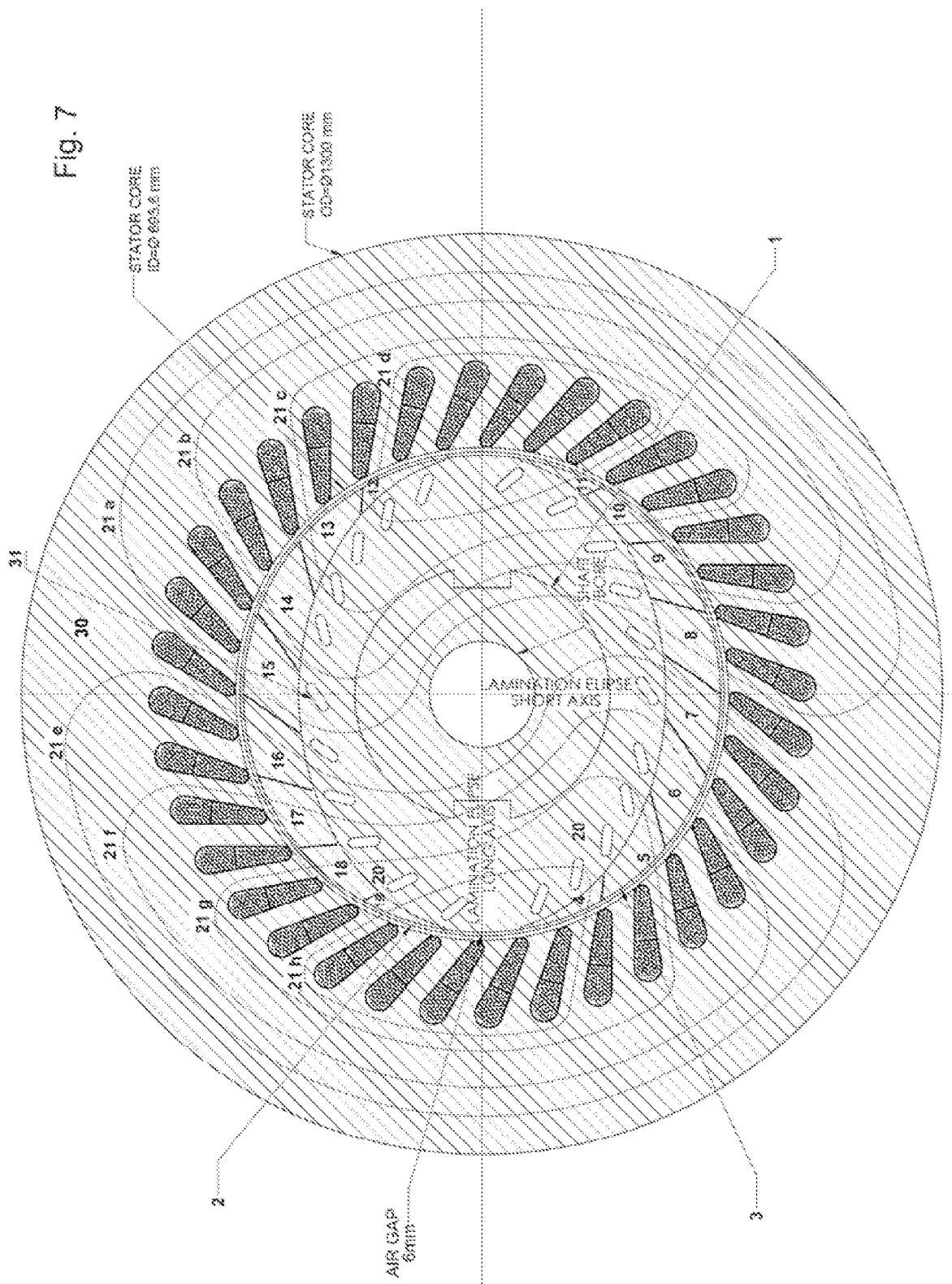

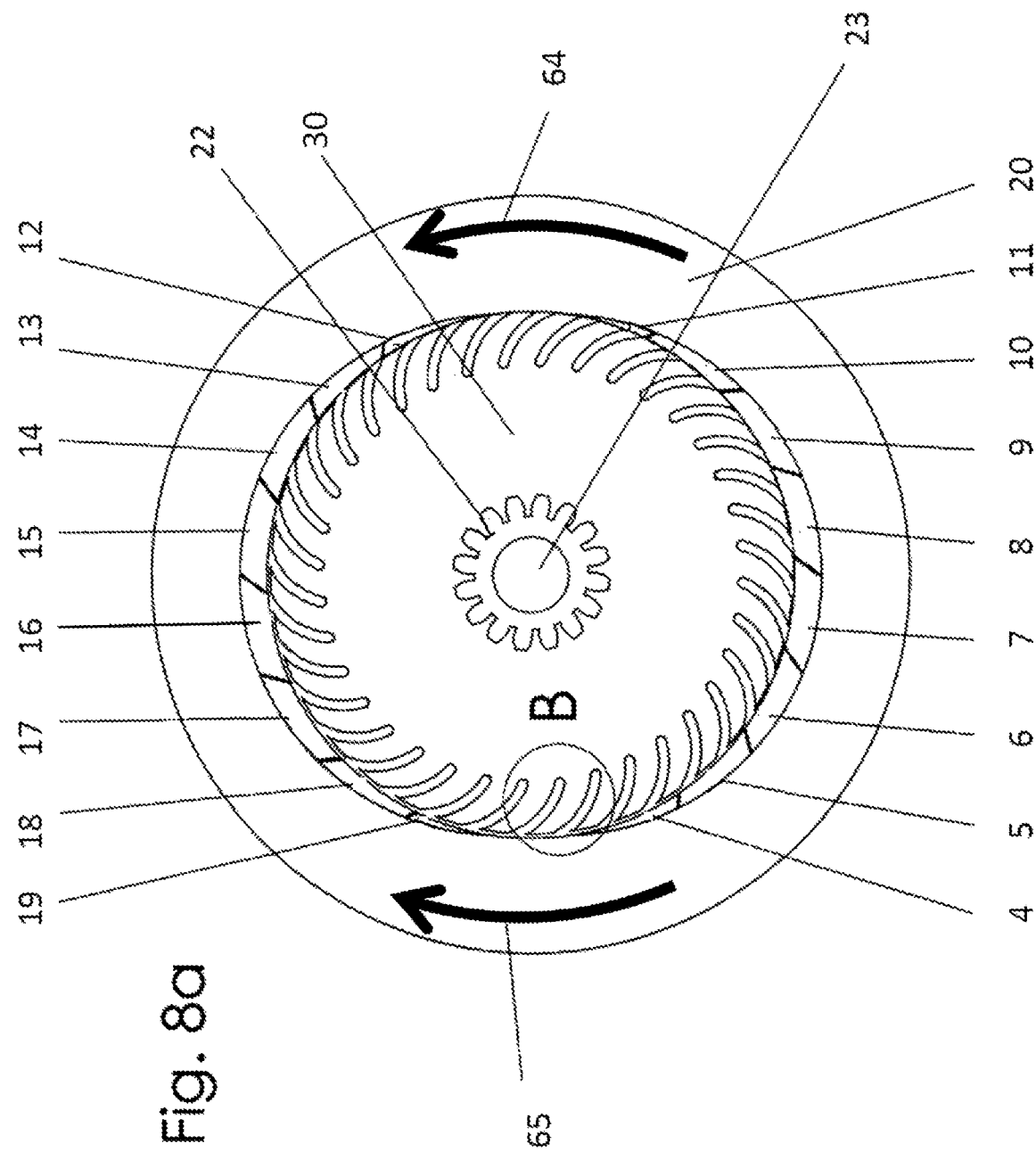

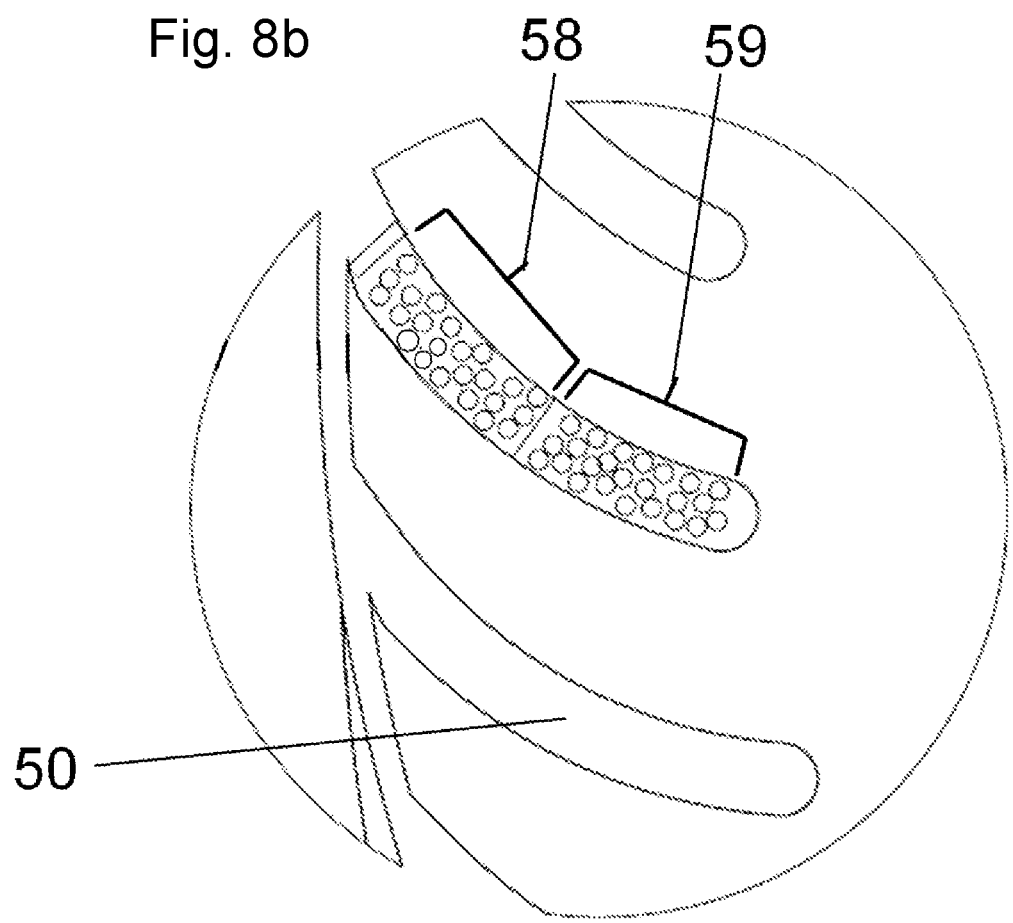
DETAIL B

DETAIL A

MOTOR GENERATOR WITH IMPROVED AIR GAP FLUX ALIGNMENT

This application is the US National Stage Application of PCT Application PCT/US2020/035616, filed Jun. 1, 2020, which claims priority to U.S. Provisional Application No. 62/855,908, filed May 31, 2019, each of said applications incorporated herein by reference in its entirety.

FIELD OF INVENTION

The present invention relates to electromagnetic motors and generators.

SUMMARY OF INVENTION

The present invention reduces hysteresis losses in the iron of motors and generators by means of improved alignment of the magnetic flux paths in the rotor and stator with the magnetic flux orientation in the air gap with the machine operating at rated torque.

Conventional motors and generators generally provide radial flux paths in the iron core between coil slots. This arrangement causes good alignment of the magnetic flux in the iron and the magnetic flux in the air gap under no-load zero-torque conditions. Perhaps this non-optimized design has persisted because the acceptance tests for many large machines are performed under no-load zero-torque conditions. Maximum torque occurs when the magnetic flux crosses the air gap at an angle of approximately 45 degrees. The flux distribution in a radial stator tooth (the iron between coils) is very uneven when the magnetic flux crossing the air gap is at a non-radial angle such as 45 degrees. The high flux regions result in high hysteresis losses. The low flux areas represent wasted iron or wasted space that could have been used for larger lower-loss conductors.

The present invention maintains continuity of flux direction as the flux passes between the stator, the air gap, and the rotor. The continuity of flux direction results in more uniform flux density, lower hysteresis losses, and more efficient use of the iron core materials while providing space for larger cross section lower-loss coils.

The present invention is applicable to a variety of motor and generator types including induction motors, synchronous motors, salient pole synchronous motors, doubly fed induction motors, permanent magnet alternators, and the like.

In accordance with a further aspect of the invention a hybrid machine may be provided wherein the magnetic field of the rotor is established by a combination of DC excitation and permanent magnets.

In accordance with a further aspect of the machine, coils may be formed of conductors that have a step-wise adjusted width-to-thickness aspect ratio in conjunction with a constant conductor cross section to allow multiple turns of identical conductor cross section to efficiently fill tapered slots.

In accordance with a further aspect of the invention, an alternating current electromotive machine, such as a motor or generator, is provided in which the exciter magnetic circuit is superimposed on the magnetic circuit of the electromotive machine. In this case DC excitation current is provided to auxiliary DC windings in the stator. This results in a non-rotating magnetic field that passes in and out of the rotor where it generates AC excitation power. This AC excitation power is then rectified to establish a DC power source in the rotor. Rectification may be accomplished by ordinary diodes or by means of externally controlled diodes, rectifiers, or transistors, for example. Control may be electrical, magnetic, or optical, for example. Optically controlled rectifiers are preferred. This establishes a non-alternating magnetic field in and between the rotor and stator. This field may act by itself or it may act in concert with a permanent magnet field. The use of permeant magnets may improve the overall efficiency of the machine while the controllable portion of the field strength may be used for Voltage and power factor control. The rotating DC excitation coils may share slots with the Rotating AC coils that collect energy for the non-rotating field establish by the DC stator windings.

In accordance with a further aspect of the invention, tapered coils may be provided that may be axially inserted with a convenient amount of clearance into the stator slots. Once in place a stretchable elastomeric shim may be inserted while in the stretched and thin state. This may be inserted while attached to a tensioned cord, for example. Once it is in the correct axial position, the tension may be reduced, allowing the elastomeric shim to shorten and expand laterally, filling the slot and pressing the coil radially inward into tight contact with the sides of the stator slot. This approach is particularly suitable for "hair pin" coils that insert like staples, having a bend only on one end.

In accordance with a further aspect of the invention, inflatable tubes may be used in lieu of elastomeric shims.

In accordance with a further aspect of the invention, the inflatable tubes may be inflated with a fusible substance.

In accordance with a further aspect of the invention, the fusible substance may also be elastomeric in order to allow the shims to be removed by stretching.

In accordance with a further aspect of the invention, alignment of the magnetic field at the air gap may be established by using adjoining magnet segments, each magnetized to provide the optimum flux alignment. The magnetization of each magnet segment may be constant across the segment or it may (preferably be) over a continuum of orientations across the face of each segment.

According to a further aspect of the invention, the segments may be electrically isolated from each other in order to minimize eddy current losses.

In accordance with a further aspect of the invention the magnets may be secured with a metal sleeve shrunk into position.

In accordance with a further aspect of the invention, the magnets may be secured with fiber reinforced plastic such as carbon fiber in an epoxy, vinyl ester, or polyester matrix, for example.

BRIEF DESCRIPTION OF THE DRAWINGS

FIG. 1 is prior art.
FIG. 3 is prior art.
FIGS. 4a, 4b, and 4c illustrate a cross section of a permanent magnet machine incorporating form wound Roebel bar coils adapted to the present invention.
FIG. 4b shows detail of circled region B within and indicated in FIG. 4a.
FIG. 4c shows detail of region E within and indicated in FIG. 4b.

FIGS. 5a, 5b, 5c, 5d, 5e, and 5f illustrate a cross section of a permanent magnet machine with formed coils in accordance with one aspect of the present invention. FIG. 5b shows detail of region A within and indicated in FIG. 5a. FIG. 5c shows detail of region D within and indicated in FIG. 5a. FIG. 5d shows detail of region E within and indicated in FIG. 5a. FIG. 5e shows detail of region B within and indicated in FIG. 5b. FIG. 5f shows detail of region C within and indicated in FIG. 5a.

FIG. 6b shows detail of region A within and indicated in FIG. 6a.

FIG. 7 illustrates a cross section of a permanent magnet machine in accordance with one aspect of the present invention wherein slots in the rotor laminations are provided to allow conductors to be inserted should the permanent magnets magnet segments ever have to be re-magnetized.

FIG. 8a illustrates a cross section of a machine with an external permanent magnet rotor (rotatable in directions 64 and 65) in accordance with one aspect of the present invention. FIG. 8b shows detail of circled region B within and indicated in FIG. 8a.

FIG. 9b shows detail of circled region A within and indicated in FIG. 9a.

FIGS. 11b and 11d show detail of circular region C as appears in embodiments of the inventive technology.

DESCRIPTION OF PREFERRED EMBODIMENTS

Figure 2:
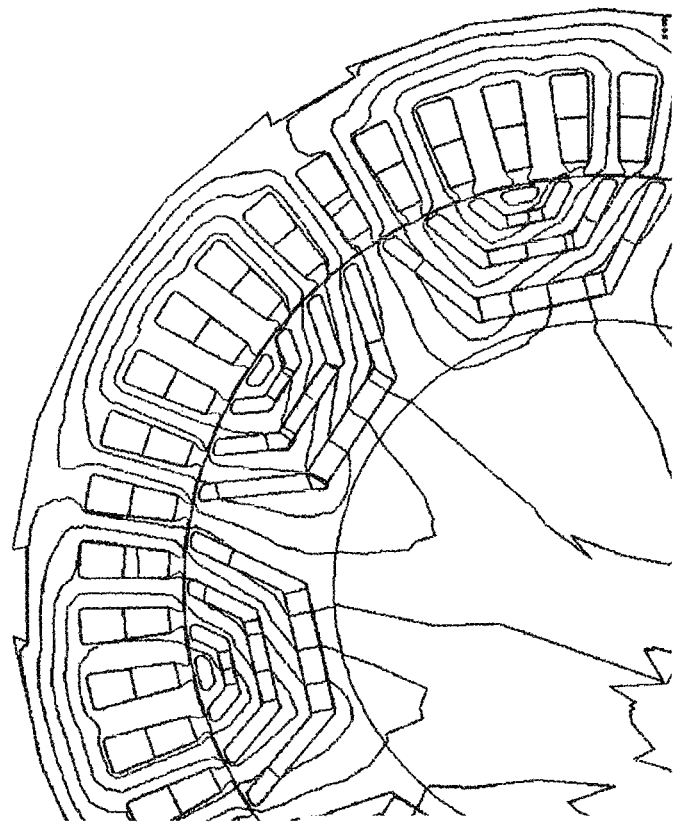
FIG. 2 is prior art.

FIGS. 1, 2, and 3 illustrate prior art configurations of magnets and slots in motors and generators.

Figure 4A:
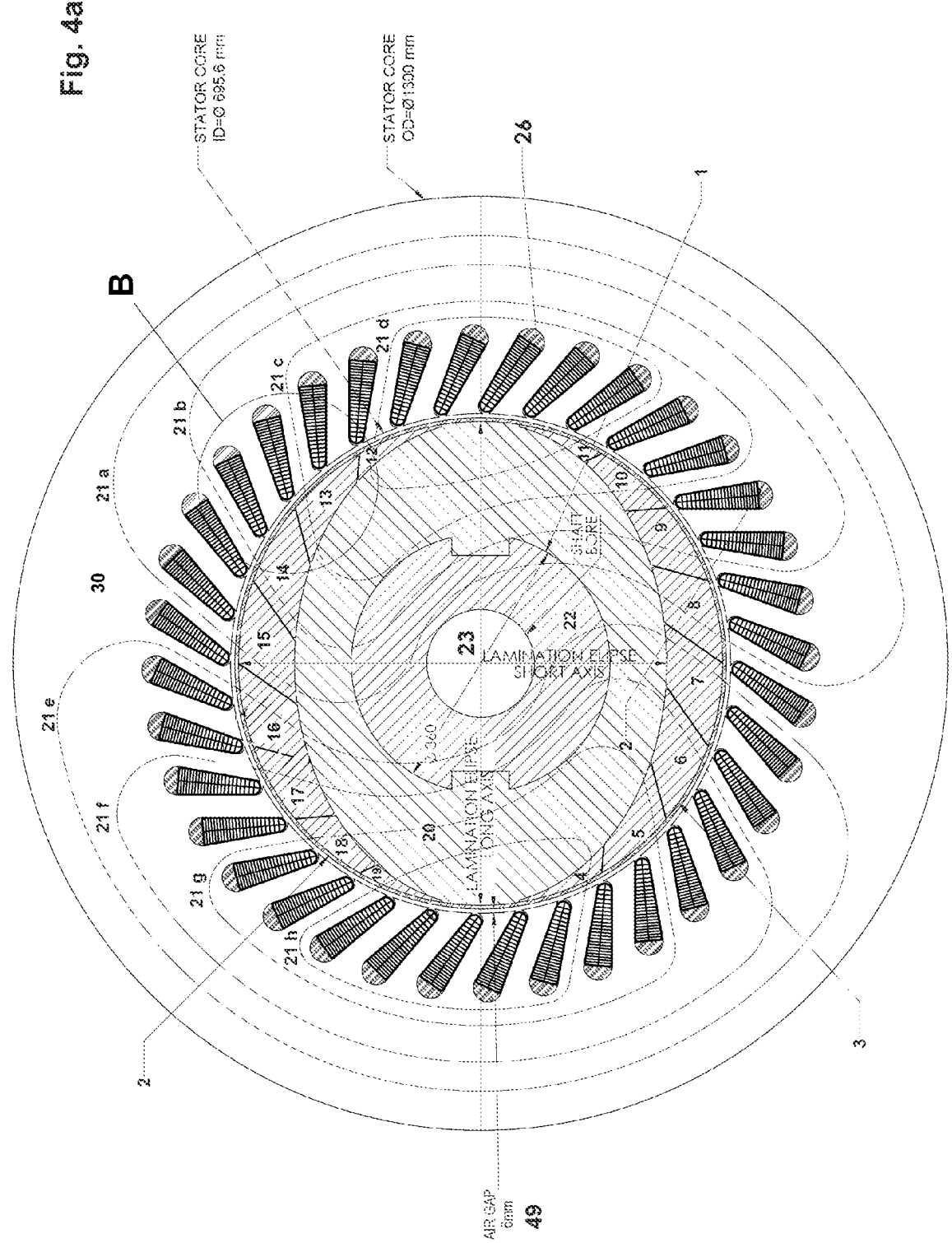
Figure 5B:
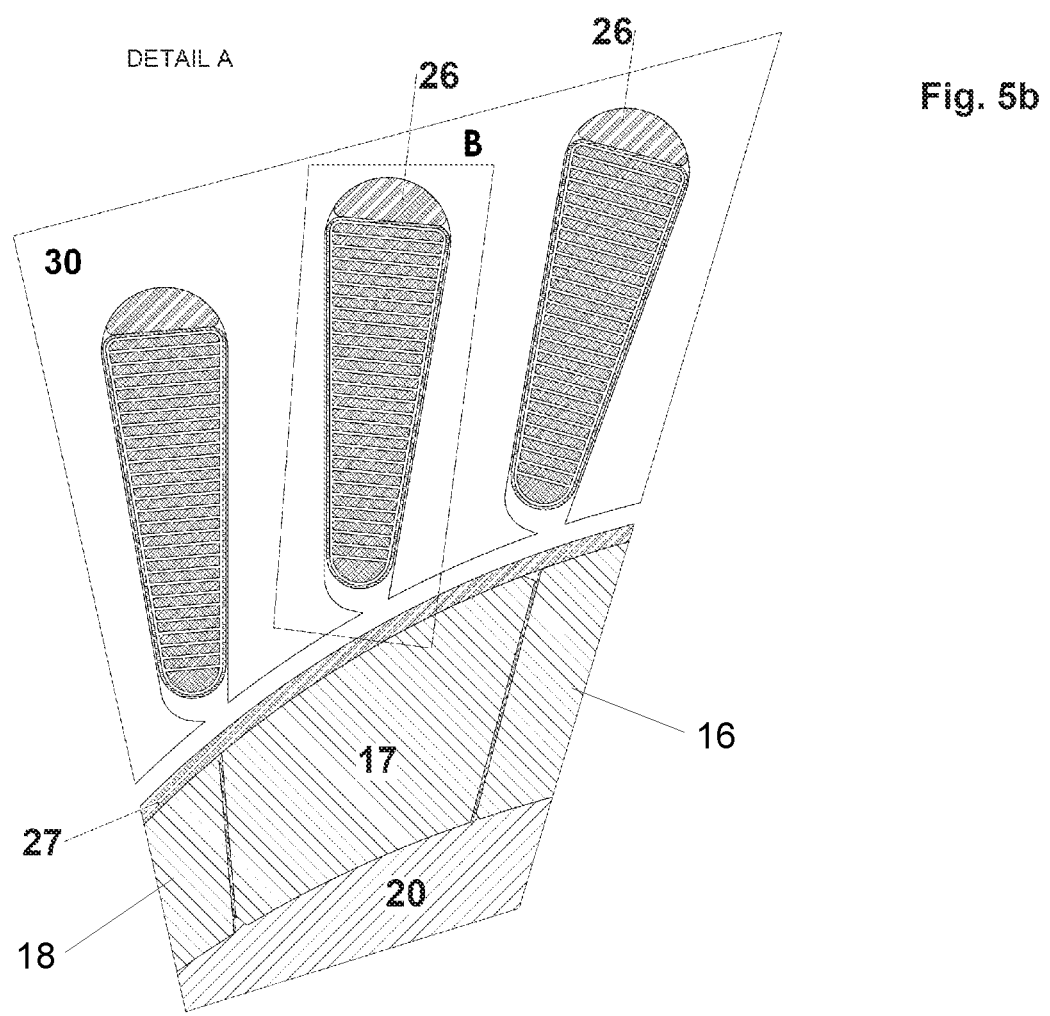
Figure 5D:
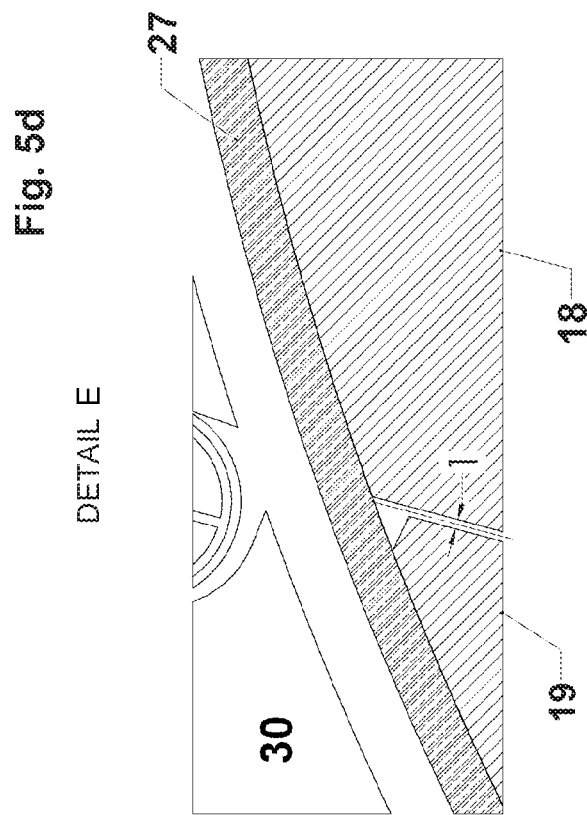
Figure 5C:
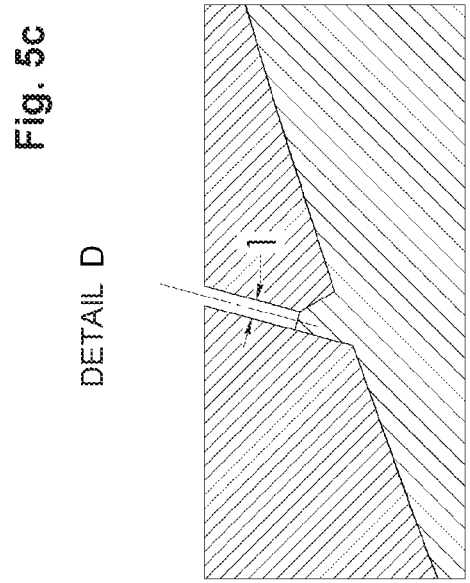
Figure 5E:
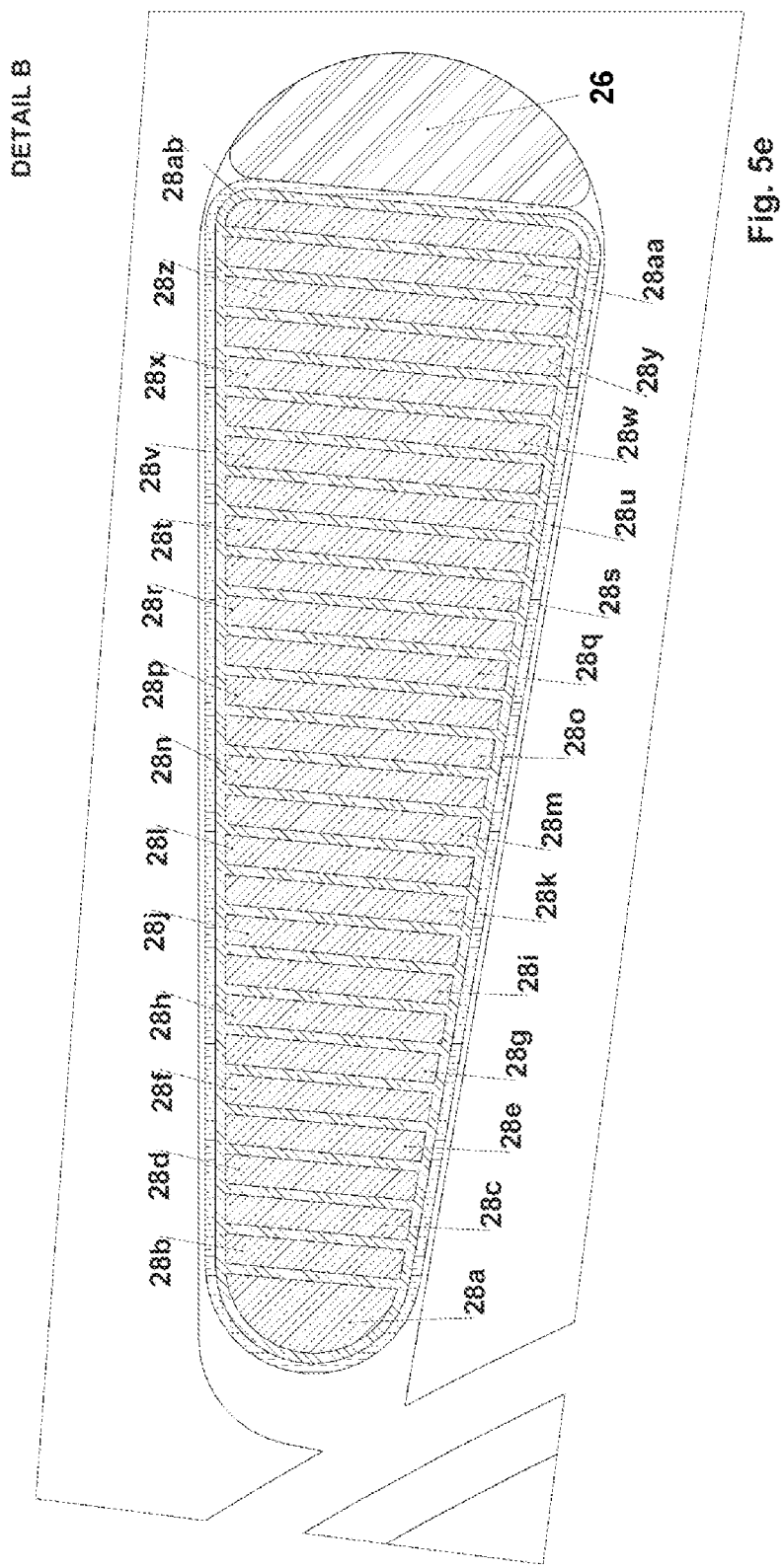

Referring to FIGS. 4a, 4b, and 4c, a cross section of a rotating electric machine with an alternating current stator, which could operate in either motor or generator mode, is illustrated. Stator core 30 carries sinusoidally varying magnetic flux illustrated by flux lines 21a, 21b, 21c, 21d, 21e 21f, 21g and 21h. This machine is asymmetric and does not function the same in all four quadrants. It is optimized for two-quadrant operation such as is required for raising and lowering an elevator or for use in conjunction with a reversible pump turbine, for example. Generating and motoring occur in these two examples with torque in the same direction but with rotation in opposite directions. In each of these two quadrants the flux lines cross the air gap 49 with the same sign of angle. For maximum power the angle of the flux lines crossing the air gap may be in the range of 30 to 45 degrees from the radial direction. Flux angles greater than 45 degrees may result in slippage or loss of synchronization between the permanent magnet poles and the coil generated poles in the stator. In accordance with one aspect of the present invention, the coil current phase angle may be adjusted to prevent loss of synchronization. Referring now also to FIG. 5f, the uni-directionally tapered stator slots 51 shown (as shown, tapered in one direction) prior to coil insertion are aligned with this angle in order to minimize flux concentrations at the tips 55 of the stator teeth 56. Likewise, the permanent magnet segments 4, 5, 6, 7, 8, 9, 10, 11, 12, 13, 14, 15, 16, 17, 18, and 19 are magnetized such that the flux may leave the magnets, cross the air gap and enter the stator core without unnecessary changes in direction. The orientation of magnetization of the permanent magnet segments may be uniform across discrete magnet segments, or, in the case of a single magnet per pole, may preferably be magnetized in a continuum of directions to maintain the design angle of air gap crossing. The required field strength varies with angular position and the magnet thickness should be varied accordingly in order to achieve economic use of expensive magnetic materials. Changes in flux direction within the air gap in prior art machines result in a greater effective air gap. The longer indirect flux path across the air gap of prior art machines results in either lower magnetic field strength or the requirement for larger magnets. The coils 60 illustrated may be similar to Roebel bars, except that the conductor cross section shape changes with each pass through the slot in order that the assembled bar fit the uni-directionally tapered stator slots 51.

Referring to FIGS. 5a, 5b, 5c, 5d, 5e, and 5f, a variation of the rotating electrical machine of FIGS. 4a, 4b, and 4c is shown. Windings 28 (e.g., 28a through 28ab) are comprised of wire flattened according to its placement order in each slot. Flattening is preferably done with automated equipment configured to establish the required thicknesses over the length of each individual wire. This allows the coil to assume a tapered shape that matches the shape of the uni-directionally tapered stator slots 51 that provide for a constant core cross sectional area and flux density as a function of radius. This constant flux density configuration minimizes hysteresis losses while optimizing the use of both iron and copper. The uni-directionally tapered stator slots 51 also allow for coil insertion from one end of the slot with generous clearances. Once the coil is fully inserted an elastomeric stretched packer 25 is threaded under tension through the back-iron end 54 of the slot. Back iron 57 is identified in FIG. 6a. The tension results in the stretched "packer" 25 assuming a reduced cross section compared to unstretched packer 26. Once the stretched packer 25 is in place the tension is released and the tensioning means may be disconnected. This results in the unstretched packer 26 fully occupying the available space and exerting a positioning preload against the back edge of the coil. Coil removal may be accomplished by tensioning again packer 26. The preload provided suppresses coil vibration.

The resulting tight contact between coil and slot improves heat transfer. Permanent magnet segments 4 through 19 may be secured with carbon fiber winding 27.

Figure 6A:
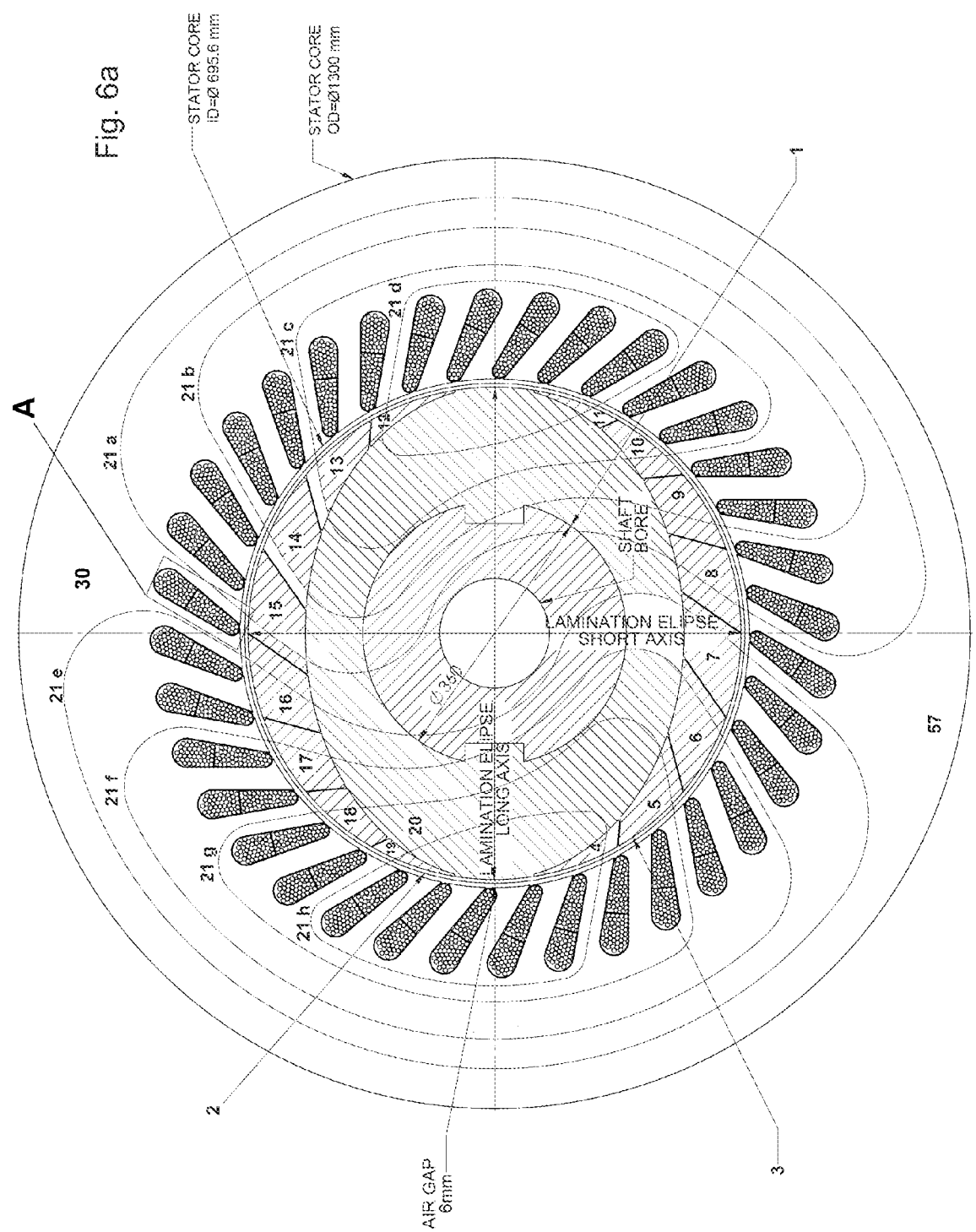
FIGS. 6a and 6b illustrate a cross section of a random wound permanent magnet machine in accordance with one aspect of the present invention.
Figure 6B:
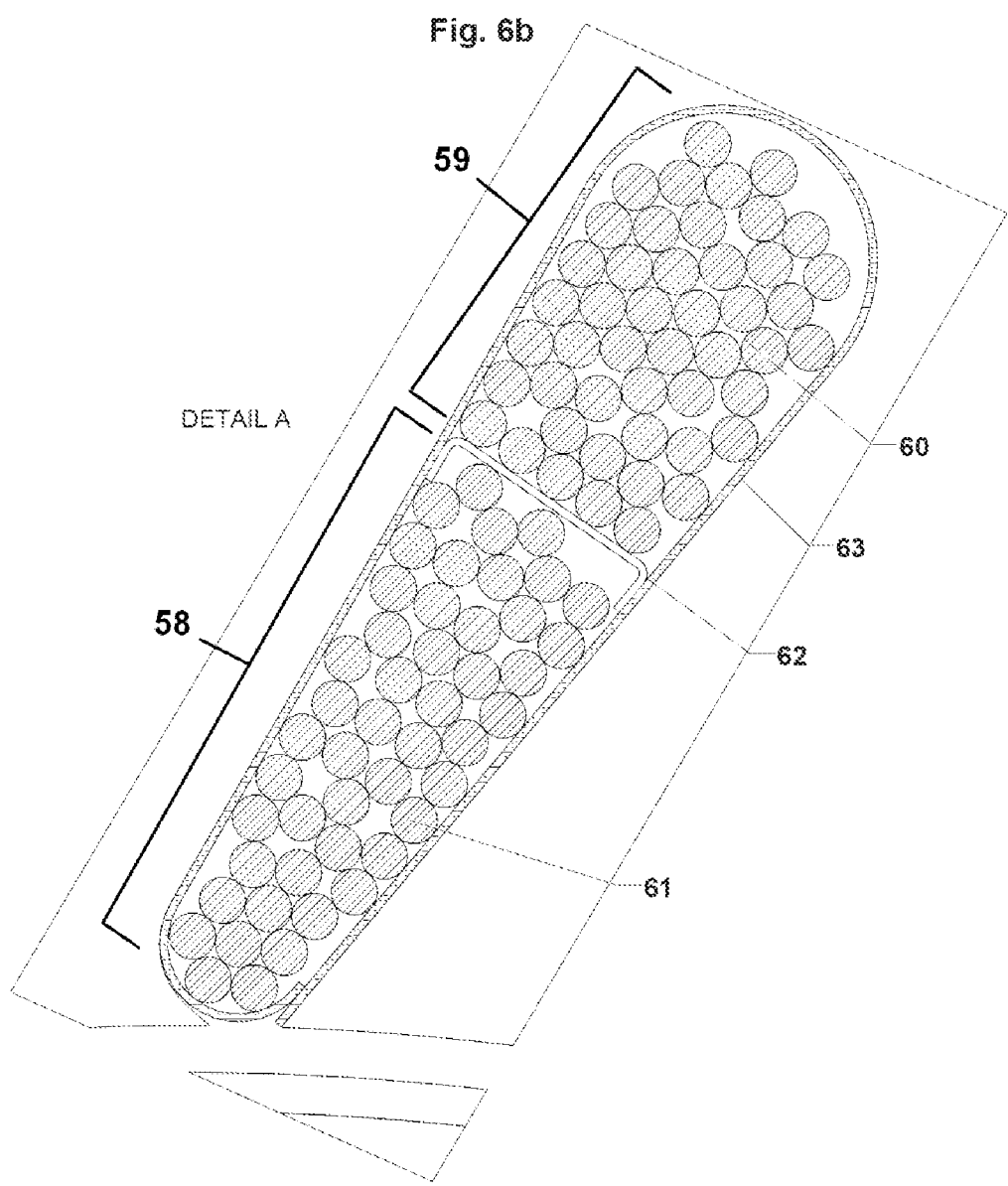

Referring to FIGS. 6a and 6b, an example arrangement of random wound coils 58 and 59 in a slot is illustrated. Coil insulation 62 separates the coils 58 and 59. Slot insulation 63 insulates the coils from the stator core 30.

Referring to FIG. 7, re-magnetizing slots 31 are provided in rotor core 20 for the purpose of re-magnetizing the permanent segments 4 through 19 should demagnetization occur due to an external short circuit or overheating the magnets for any reason. Conductors placed in such slots for remagnetization would preferably be used in conjunction with conductors positioned and secured outside of the rotor, removed from the stator.

Referring to FIGS. 8a and 8b, a cross section of an exterior magnet rotating electrical machine, similar to those used for permanent magnet UAV motors, is shown. Splined shaft 22 prevents rotation of stator core 30. Splined shaft 22 is preferably non-magnetic in order to minimize eddy current losses that would otherwise be caused by alternating flux passing through splined shaft 22. Splined shaft 22 may include hole 23 which may be used to augment cooling, as part of a heat pipe for example. In the two-pole configuration shown, flux must pass across the diameter of stator core 30. The splined connection between splined shaft 22 and stator core 30 minimizes the required diameter of splined shaft 22 and thereby minimizes the reluctance of the diametral flux path through the assembly comprised of splined shaft 22 and stator core 30. Permanent magnet segments 4 through 19 are each magnetized with a flux orientation aligned with the nominal rated load flux orientation crossing the air gap. Again, flux lines that do not change direction as they cross the air gap result in a shorter effective air gap, minimize the reluctance of the magnetic circuit and allow the use of minimal magnetic materials, such as rare earths. FIG. 8b illustrates example coils 58, 59 in a slot (e.g., non-tapered slot 50) designed to guide the magnetic flux lines between the rated torque orientation in the air gap and the diametral flux path across the two-pole machine illustrated. It should be noted that differing numbers of poles require different flux paths through the rotor.

Figure 9A:
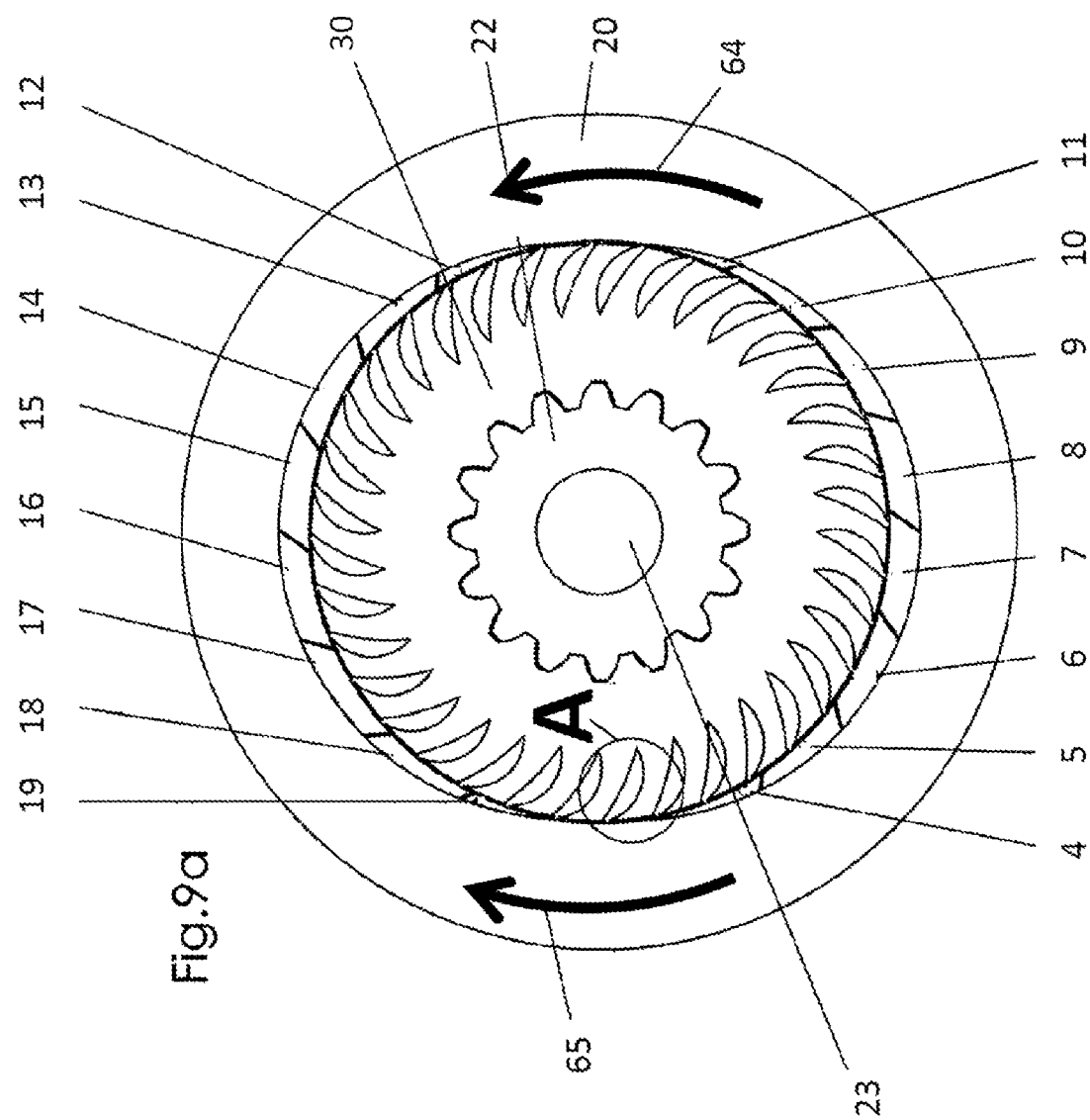
FIGS. 9a and 9b depict an external rotor permanent magnet machine.
Figure 9B:
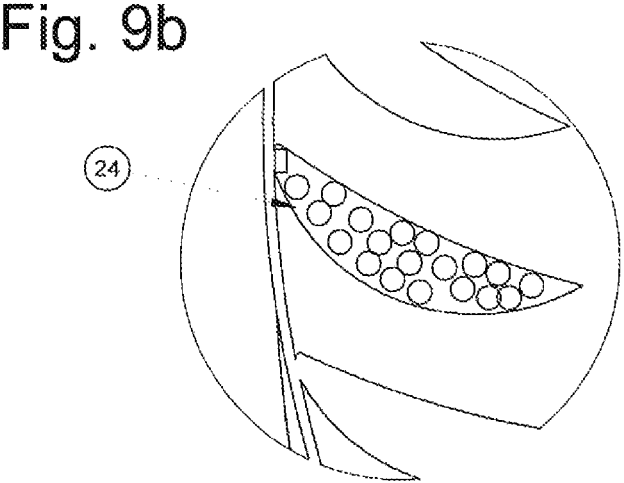

Referring to FIGS. 9a and 9b, a variation of the machine of FIGS. 8a and 8b is shown. In this case bi-directionally tapered slots 24 are shaped (as shown, tapered in two different directions) to avoid magnetic flux concentrations at either end of the slots 24.

Figure 10:
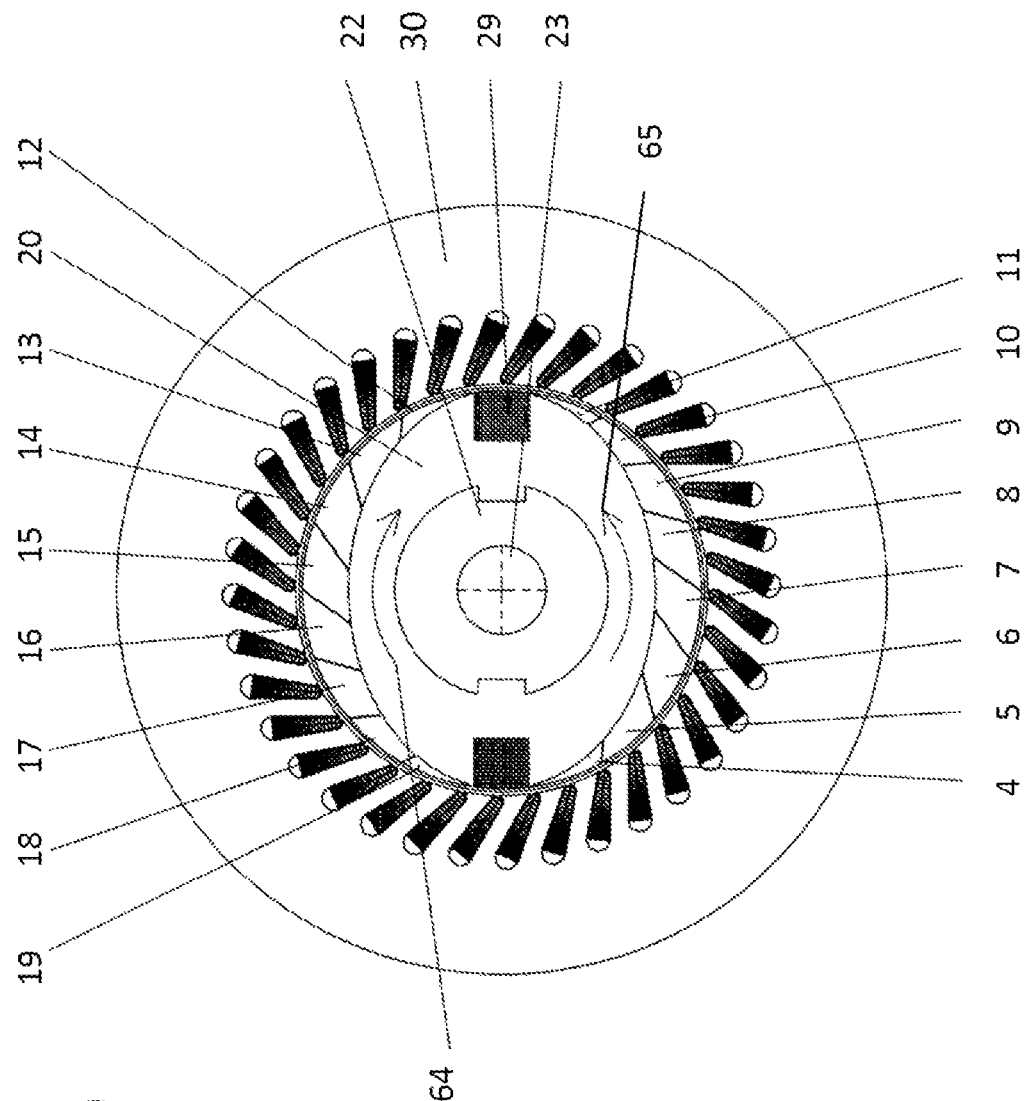
FIG. 10 is a hybrid permanent magnet machine with an excitation coil.
Figure 11A:
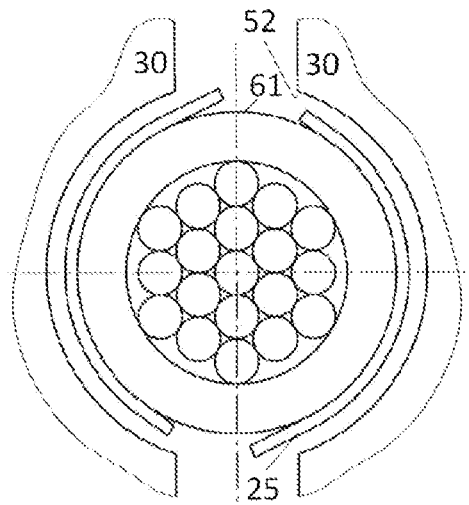
FIG. 11a shows a prior art high voltage rotating electrical machine coil.
Figure 11B:
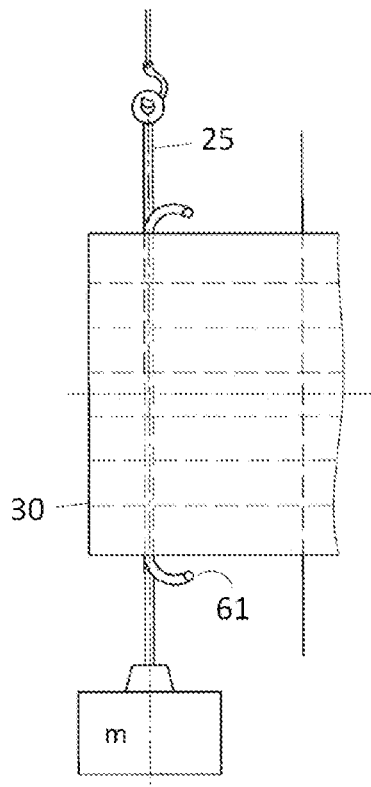
FIGS. 11b-d depict a coil fixing method.
Figure 11C:
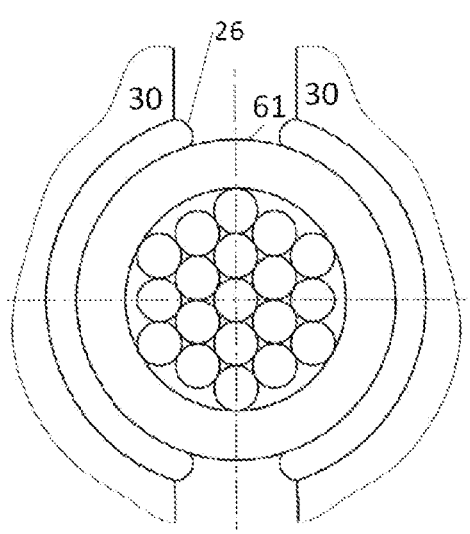
Figure 11D:
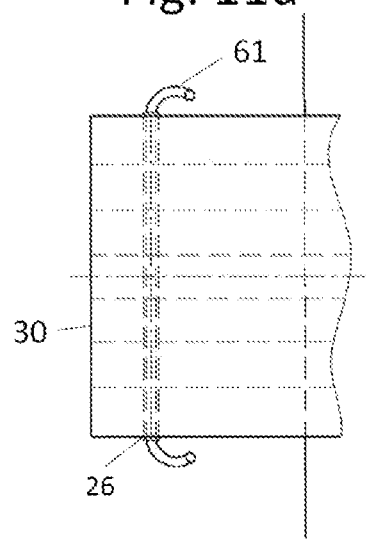

Referring to FIG. 10, a hybrid synchronous machine is illustrated in cross section. This machine combines permanent magnet segments 4 through 19 with a rotor field coil 29 in order to provide control of Voltage and power factor while retaining some of the efficiency advantage of the permanent magnet field. The rotor field coil 29 may be energized in either direction so as to either add to or subtract from the field provided by the permanent magnet segments. The rotor field coil 29 may be energized through conventional slip rings, through a conventional (prior art) brushless exciter), or, in accordance with a further aspect of this invention, excited through a brushless exciter co-located with and superimposed upon the primary synchronous alternator illustrated.

Referring to FIGS. 11a, 11b, 11c, and 11d, unstretched packers 26 may take the shape of flat rubber bands. Stretched packers 25 may be threaded through circular portion of high voltage stator slot 52 while stretched. By this means a circular coil 61 may be secured in a circular portion of high voltage stator slot 52 in the stator core 30. This may be used in conjunction with high Voltage rotating electrical machine coils such as are incorporated into the ABB Powerformer® high Voltage generators (see FIG. 11a).

Figure 12:
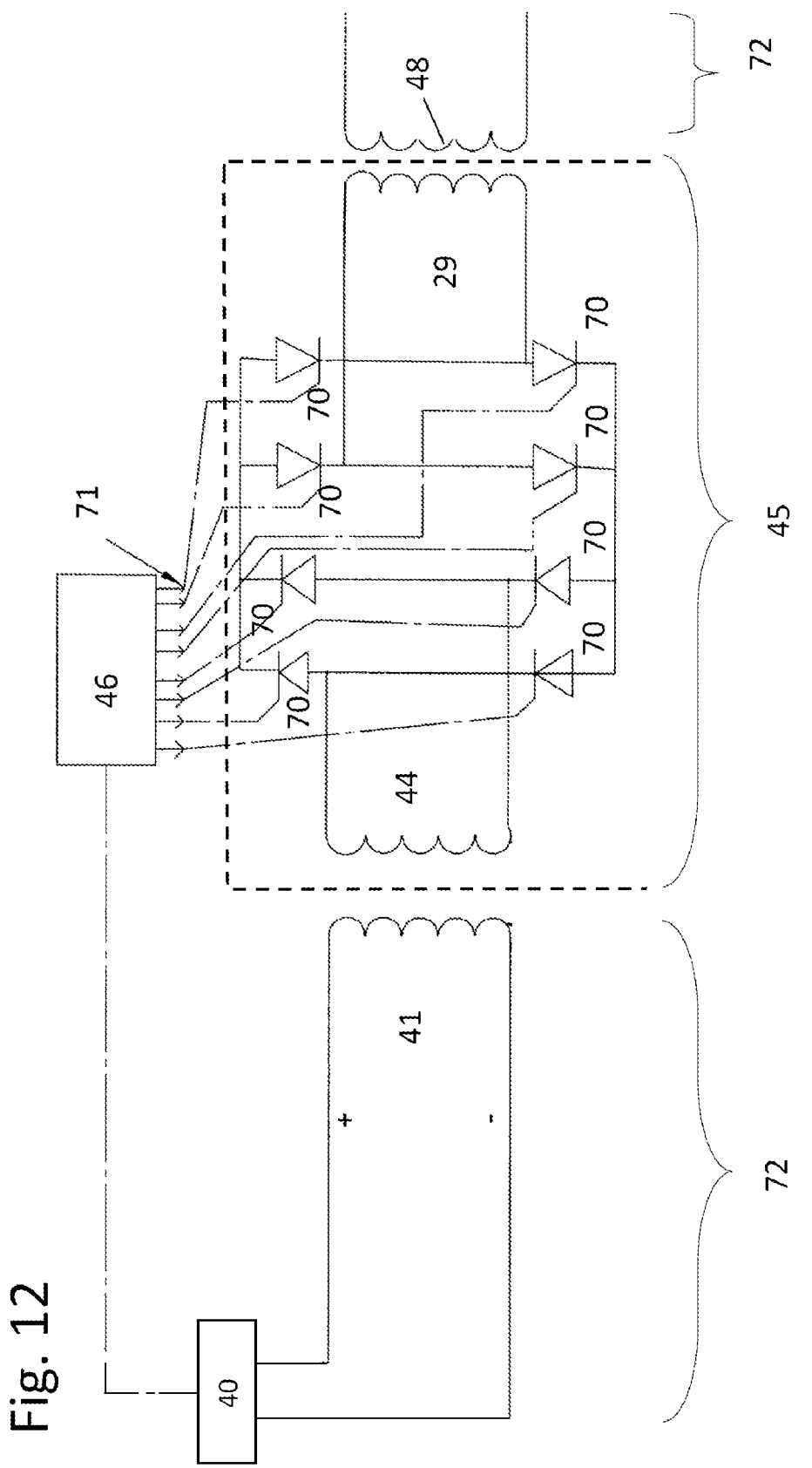
FIG. 12 is a schematic of brushless excitation system in conjunction with the present invention.

Referring to FIG. 12, the excitation system may comprise an auxiliary winding (stator DC excitation coil) 41 co-located with the AC power stator windings 48 to produce a non-rotating magnetic field with a magnetic circuit passing through both stator 72 and rotor 45. This results in AC power being generated in an auxiliary winding 44 in the rotor 45. This AC power, available in the rotor 45, is rectified to provide DC power to the rotor field coil 29. Optical rectifier controller 46 controls optically controlled rectifiers 70 through optical link 71. Optically controlled rectifiers 70 may switch the polarity of and adjust the rotor field coil 29. Optically controlled rectifiers 70 may be substituted with functionally similar means such as small photodiodes controlling conventional silicon-controlled rectifiers or the functional equivalent. This configuration overcomes the complexity of mounting a separate exciter onto a larger alternator wherein the larger alternator may have large air gaps and large bearing clearances not compatible with those of the exciter. The present invention in this regard provides a cheaper, more robust, and more compact exciter configuration. The exciter magnetic circuit is superimposed on, i.e., co-located with, the primary magnetic circuit of the motor or generator. This configuration eliminates the need for a separate excitation generator. Separate excitation generators tend to be smaller and may require smaller air gaps and have smaller positioning tolerances for the rotor within the stator. Elimination of the separate magnetic circuit for the rotor reduces parts count, machine weight, machine size and machine cost.

Referring to FIG. 12, excitation controller 40 supplies DC current to auxiliary winding 41 (stator DC excitation coil). This results in an alternating current power being delivering to auxiliary winding 44 in rotor 45. The resulting AC power is rectified with optically controlled rectifier 46. The resulting DC power can be of either polarity depending upon which optical rectifier control is activated. This DC power is applied to rotor field coil 29. This power can be used to create a field by itself or can be used to create a rotor magnetic field in conjunction with permanent magnet segments in the rotor. The output power is drawn from the generator through the AC power stator windings 48. Note that this system may be configured as a generator, as a synchronous motor, or as a synchronous condenser.

In accordance with a further aspect of the invention, the machine may be designed for submersible use. Its end coils may be embedded in rubber. Its stator pole face surfaces may likewise be embedded in rubber. The rubber is preferably vulcanized to the surface of the stator core laminations using a bonding agent such as Lord Chemical Company Chem-Lok® Furthermore, a stainless steel sleeve fitted to the rotor can slide on the rubber bonded to the stator with water lubrication with very little wear. The assembly acts as a rubber bearing similar to those used for ship stern tubes. This is superior to covering the pole face surface in stainless steel because, unlike stainless steel, the rubber does not incur eddy current losses. The rubber covered stator in conjunction with a stainless steel covered rotor may also be used in the case of a configuration wherein the rotor is on the outside of the stator.

It should be noted that the improvements disclosed herein apply to rotating electromagnetic machines of varying pole numbers and phases. The 2 pole machines herein illustrated are but examples.

We claim:

1. A rotating electrical machine, comprising:
   an alternating current stator with stator slots, arranged at an angle relative to a radial direction of the alternating current stator, each stator slot configured to house a stator coil; and
   a rotor that rotates relative to said alternating current stator, an air gap being present between said stator and a surface of said rotor and the rotor including:
   a rotor core; and
   a plurality of permanent magnet segments arranged circumferentially along a surface of the rotor core to provide a magnetic flux that crosses the air gap and is substantially aligned with the angle of the stator slots at rated load conditions.

2. The rotating electrical machine of claim 1, wherein each of the stator slots comprises one of a bi-directionally tapered stator slot or a non-tapered stator slot.

3. The rotating electrical machine of claim 1, wherein the rotor core further comprises a plurality of re-magnetizing slots arranged to re-magnetize the plurality of permanent magnet segments in response to demagnetization of the plurality of permanent magnet segments.

4. The rotating electrical machine of claim 3, wherein demagnetization of the plurality of permanent magnet segments occurs in response to at least one of an external short circuit or overheating of the plurality of permanent magnet segments.

5. The rotating electrical machine of claim 1, wherein the plurality of permanent magnet segments are electrically isolated from one another.

6. The rotating electrical machine of claim 1, wherein each of the plurality of stator slots is configured to receive an elastomeric packer to apply a force against a back edge of the corresponding stator coil to reduce vibration of the stator coil during operation of the rotating electrical machine.

7. The rotating electrical machine of claim 6, wherein each of the plurality of stator slots comprises a unidirectionally tapered stator slot.

8. A rotating electrical machine, comprising:
an alternating current stator, having a radial direction and including a plurality of stator slots arranged at an angle relative to the radial direction, each stator slot having a front end and an opposing back end and configured to house a stator coil positioned extending from the front end towards the back end and a packer positioned between the back end and the stator coil; and
a rotor that rotates relative to said alternating current stator, a gap present between said stator and said rotor and the rotor further including:
a rotor core; and
a plurality of permanent magnet segments angularly arranged along a surface of the rotor core, each of the plurality of permanent magnet segments configured to be magnetized with an orientation of the magnetic flux crossing the air gap that is substantially aligned with the magnetic flux at rated load conditions of the rotating electrical machine.

9. The rotating electrical machine of claim 8, wherein the packer in each stator slot comprises an elastomeric packer.

10. The rotating electrical machine of claim 8, wherein the plurality of permanent magnet segments are electrically isolated from one another to reduce eddy current losses.

11. The rotating electrical machine of claim 8, wherein the rotor core further comprises a plurality of re-magnetizing slots configured to re-magnetize the plurality of permanent magnet segments if demagnetization of the plurality of permanent magnet segments occurs.

12. A rotating electrical machine, comprising:
an alternating current stator with stator slots, each stator slot having an axis that is arranged at an angle relative to a radial direction of the alternating current stator;
a rotor that rotates relative to said alternating current stator, an air gap being present between said stator and said rotor and said axes of the stator slots are substantially aligned with a magnetic flux that crosses the air gap at rated load conditions, and rotor magnetization substantially aligned with said magnetic flux that crosses the air gap at said rated load conditions, and the rotor including:
a rotor core;
a plurality of permanent magnet segments angularly arranged on the rotor core; and
a plurality of re-magnetizing slots arranged in the rotor core to re-magnetize the plurality of permanent magnet segments when demagnetization of the plurality of permanent magnet segments occurs.

13. The rotating electrical machine as described in claim 12 further comprising a rotor field coil.

14. The rotating electrical machine of claim 12, wherein demagnetization of the plurality of permanent magnet segments occurs in response to at least one of an external short circuit or overheating of the plurality of permanent magnet segments.

15. The rotating electrical machine of claim 12, wherein the plurality of permanent magnet segments are electrically isolated from one another.

* * * * *